Oct. 8, 1957 R. A. MAHAFFY ET AL 2,808,690
MACHINE FOR EVACUATING AND SEALING CONTAINERS
Filed Nov. 30, 1953 12 Sheets-Sheet 1
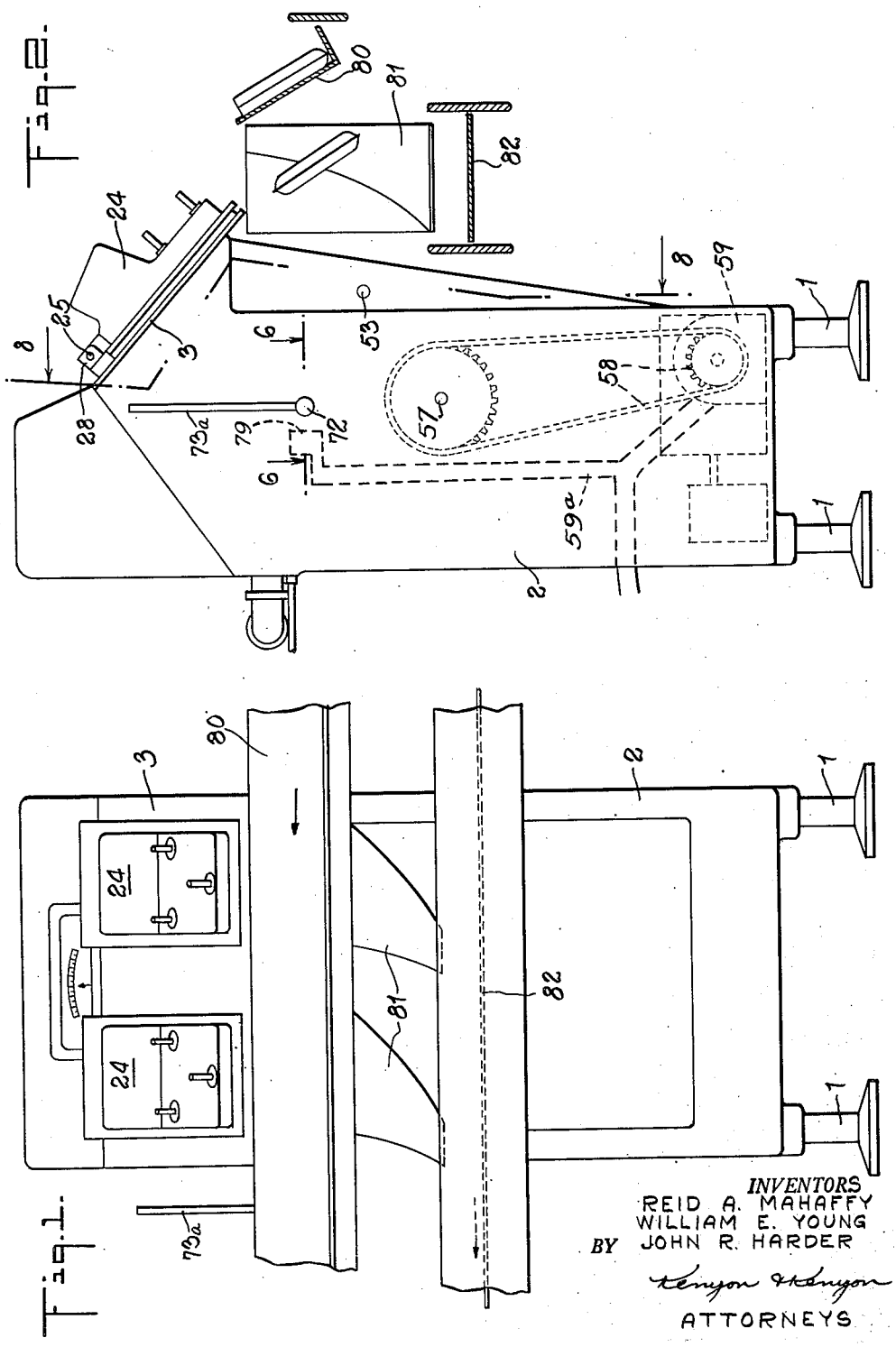
INVENTORS
REID A. MAHAFFY
WILLIAM E. YOUNG
BY JOHN R. HARDER
Kenyon & Kenyon
ATTORNEYS Oct. 8, 1957 R. A. MAHAFFY ET AL 2,808,690
MACHINE FOR EVACUATING AND SEALING CONTAINERS
Filed Nov. 30, 1953 12 Sheets-Sheet 2
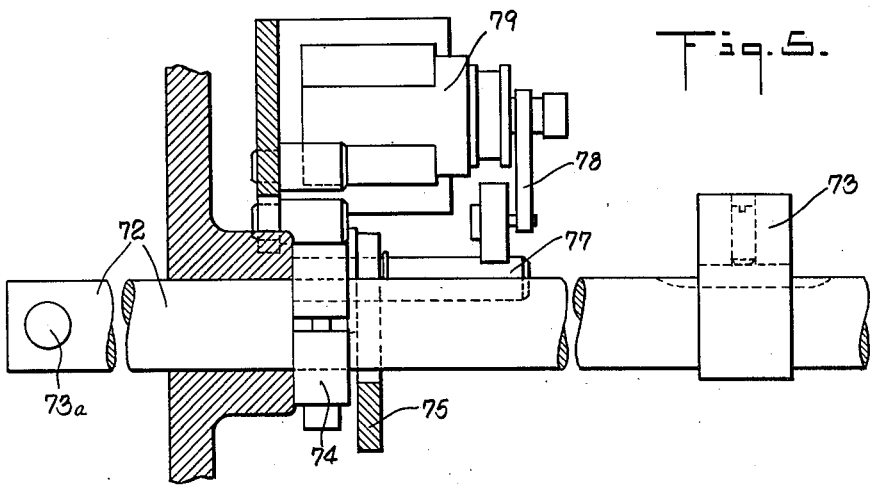
Fig. 5.
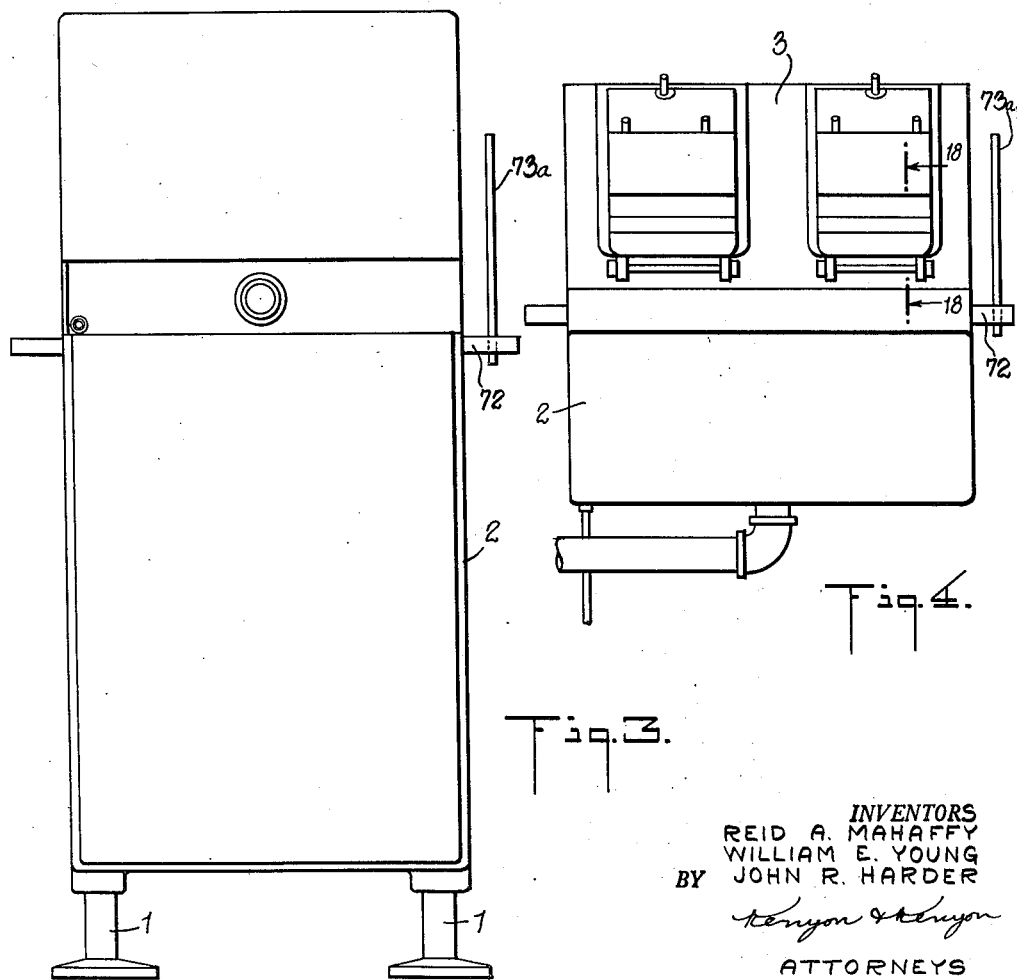
Fig. 4.
Fig. 3.
INVENTORS
REID A. MAHAFFY
WILLIAM E. YOUNG
BY JOHN R. HARDER
Kenyon & Kenyon
ATTORNEYS

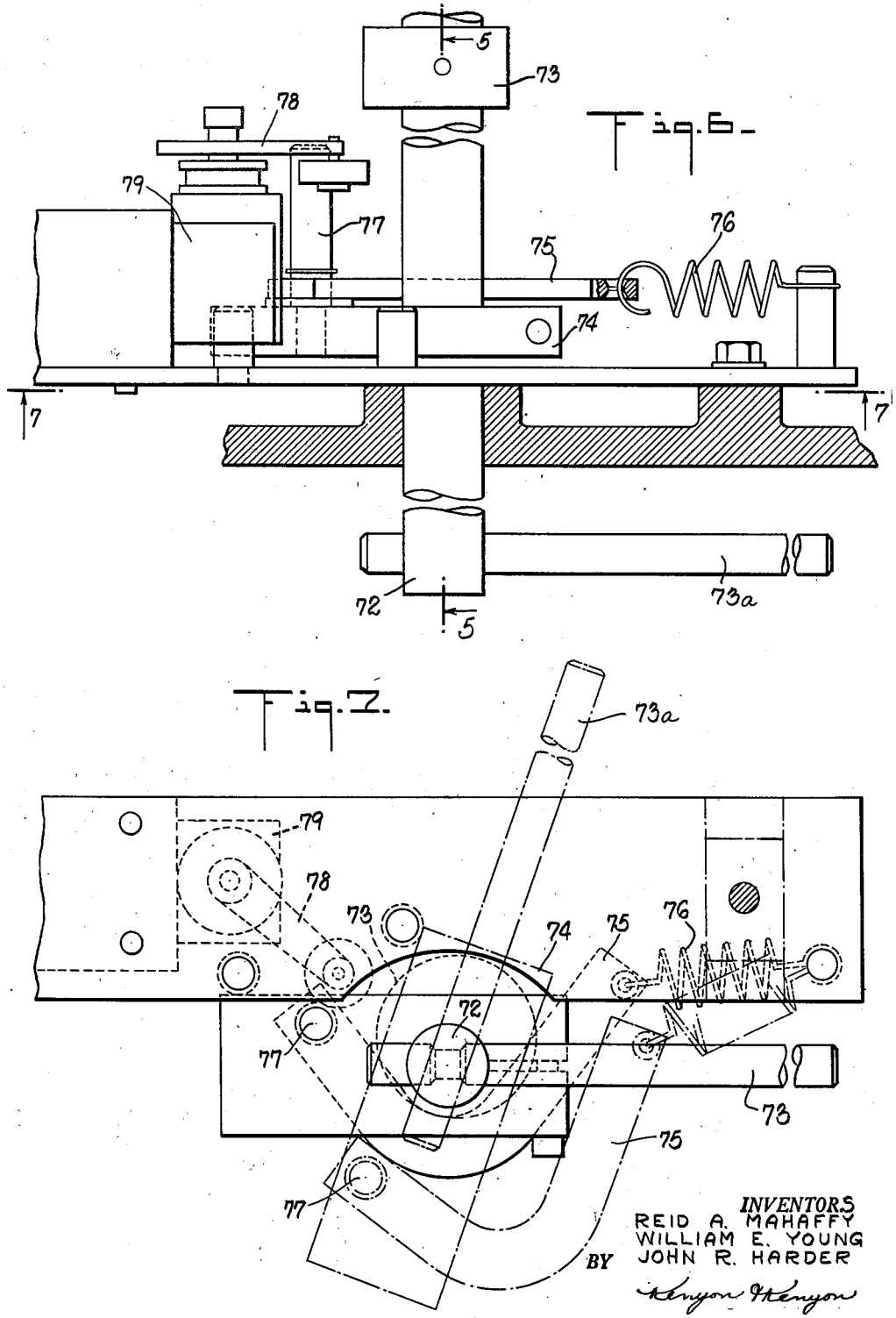

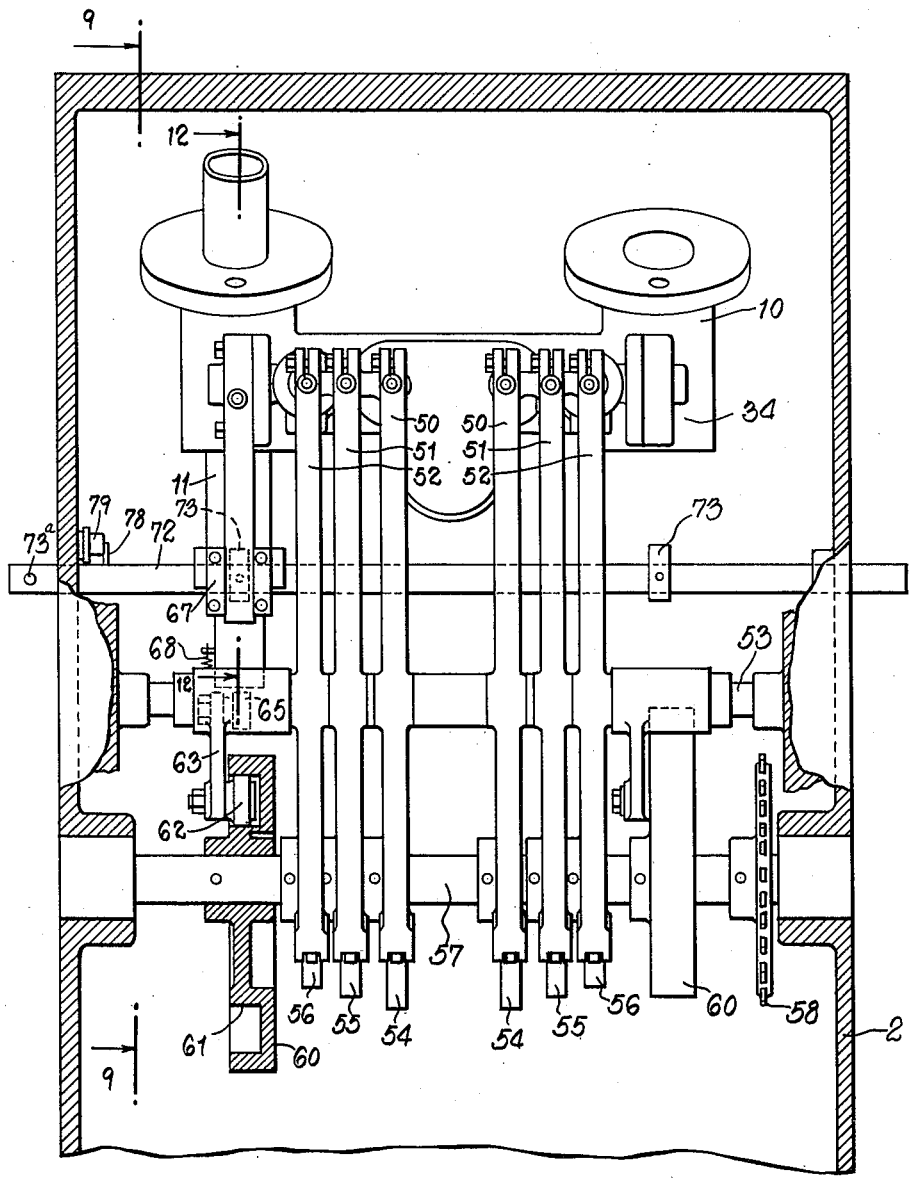

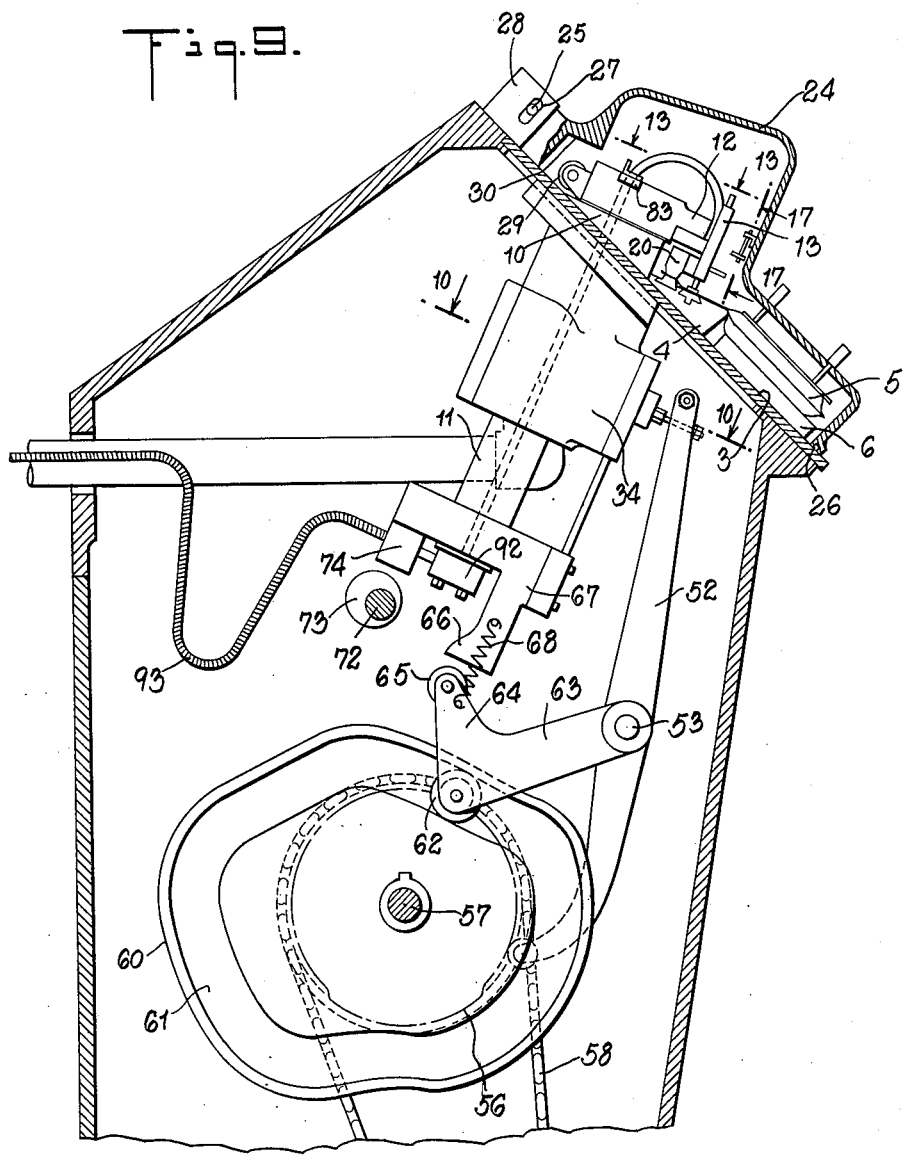

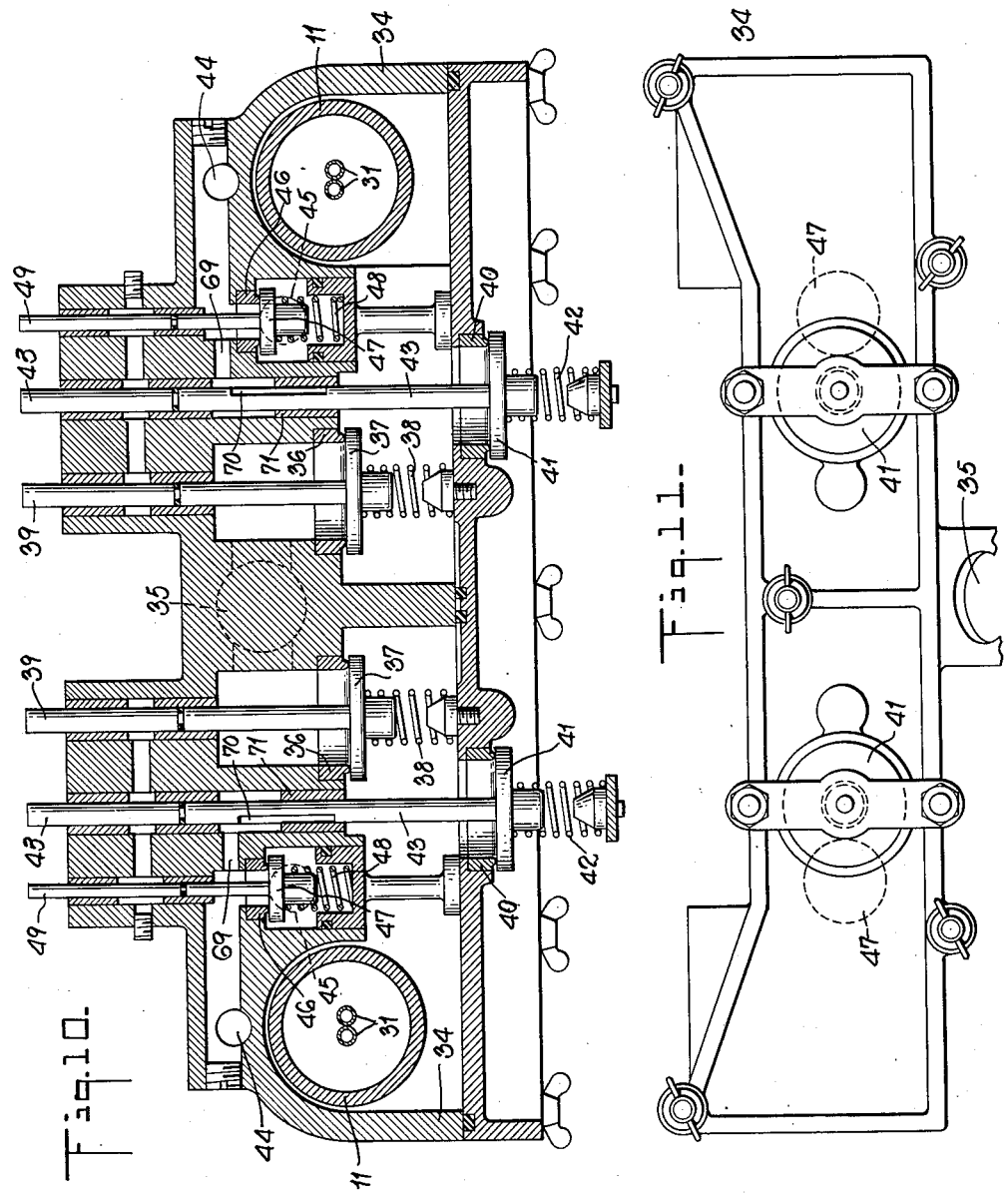

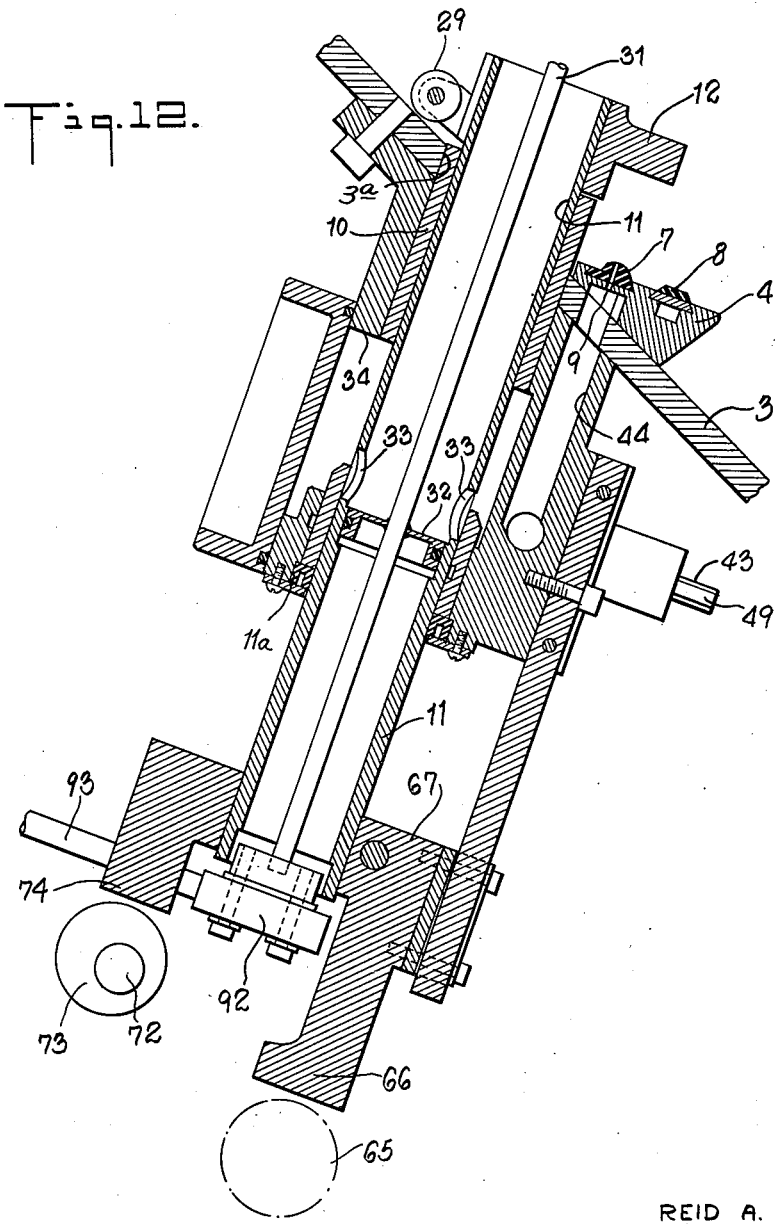

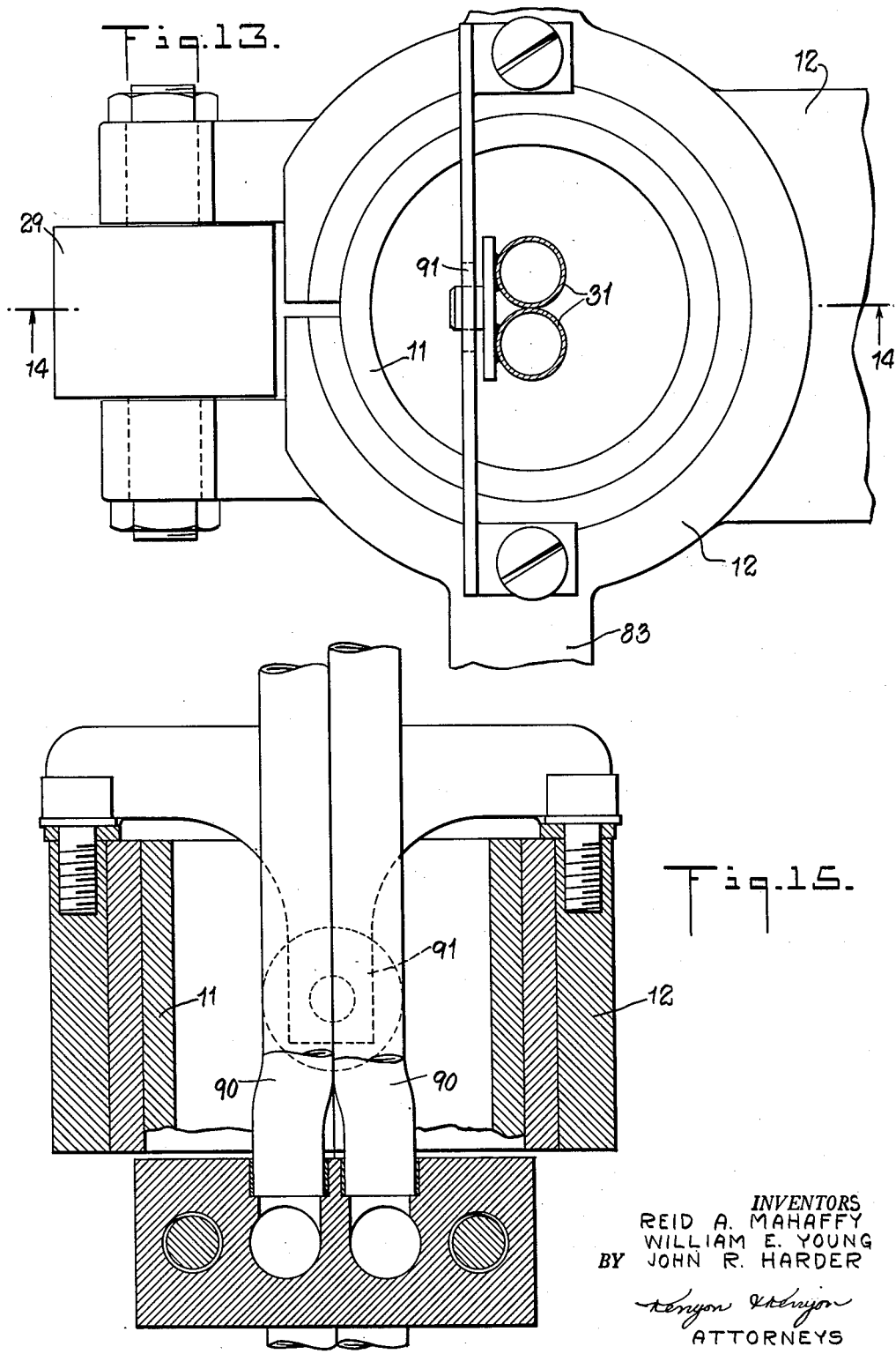

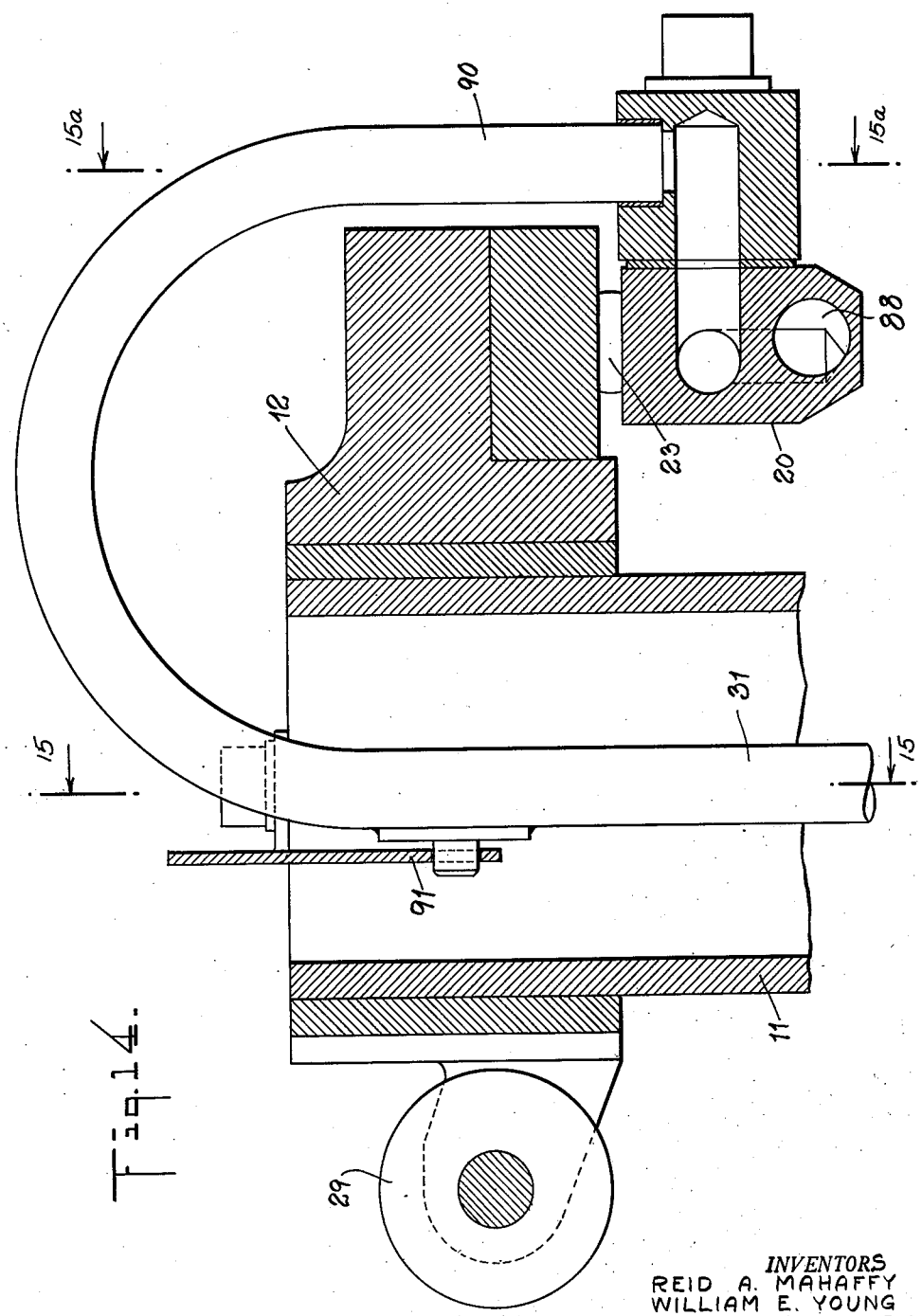

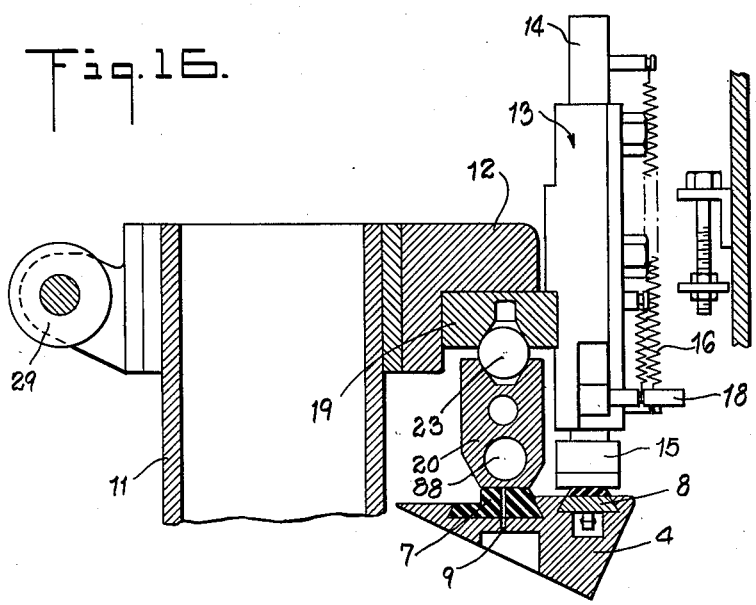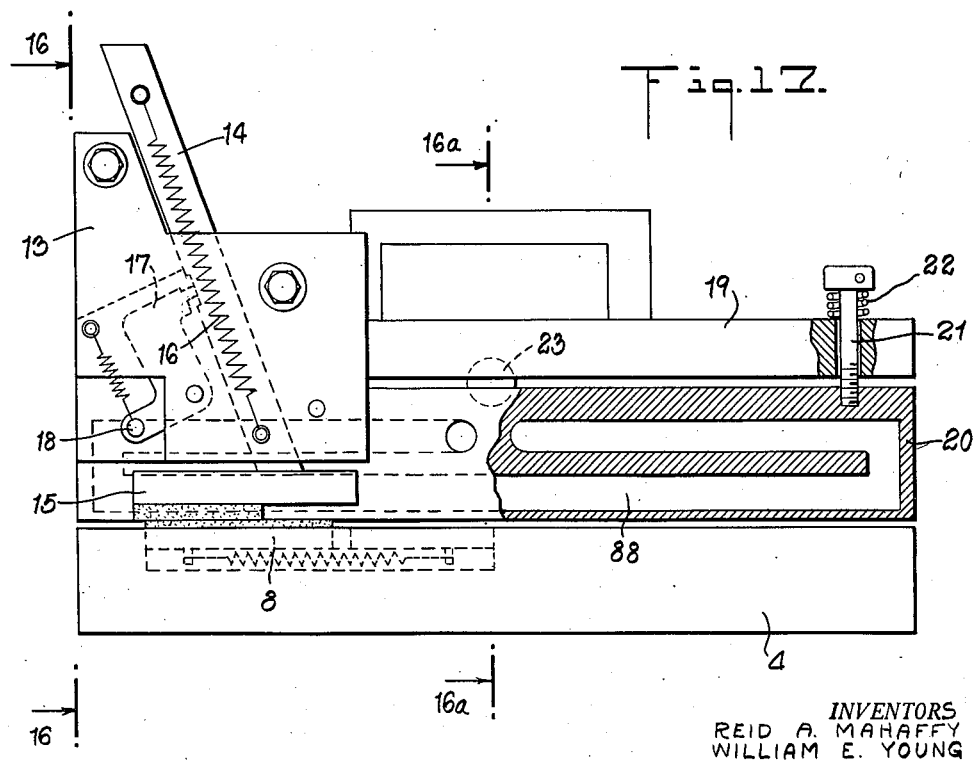

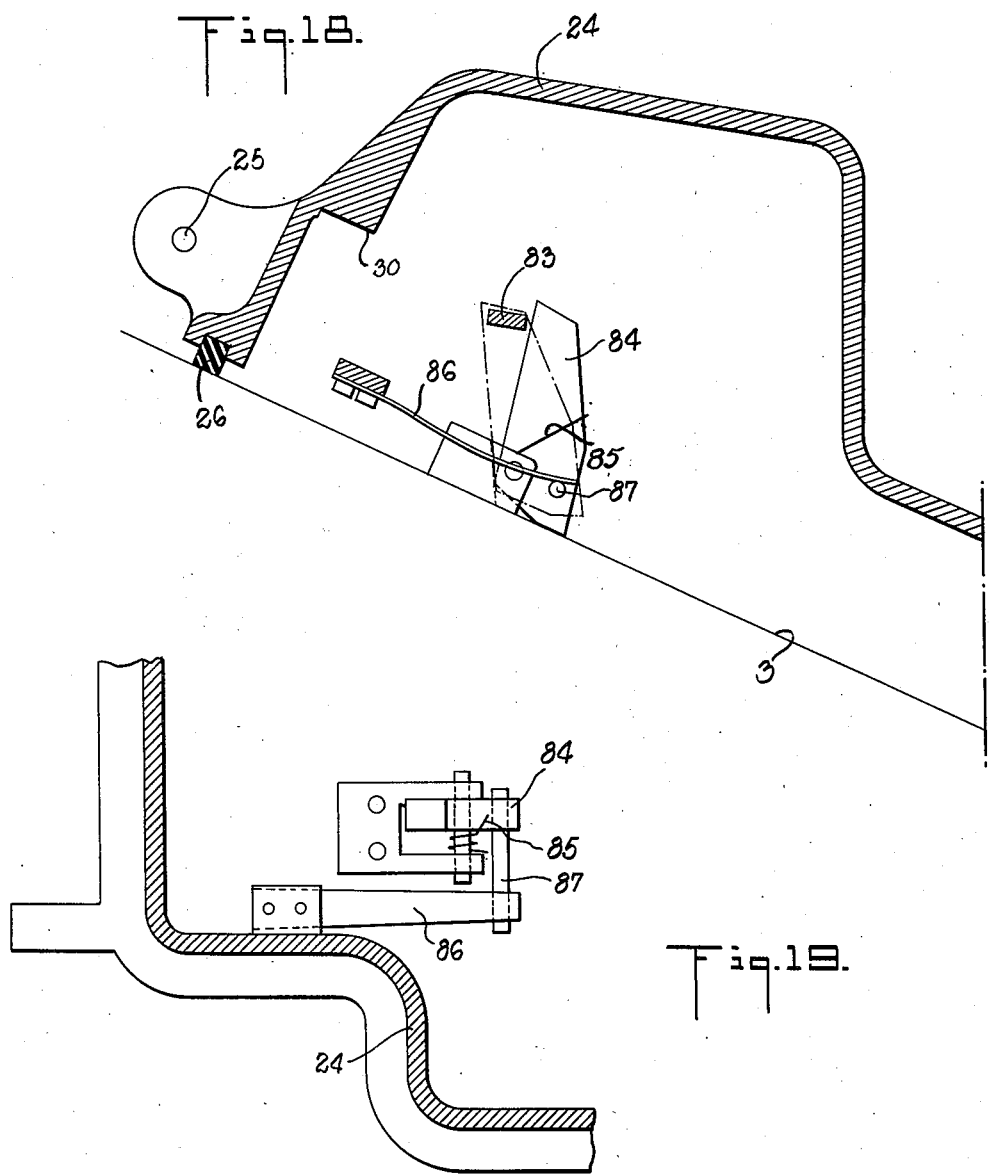

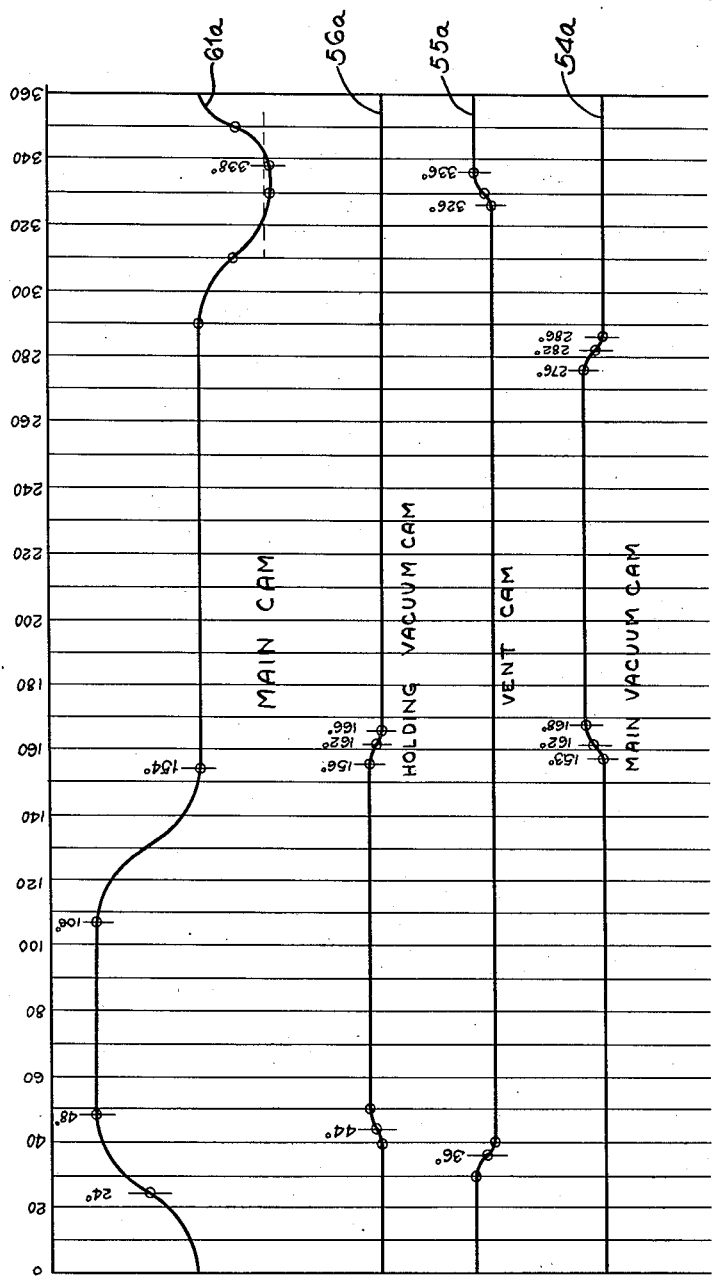

United States Patent Office 2,808,690
Patented Oct. 8, 1957

2,808,690

MACHINE FOR EVACUATING AND SEALING CONTAINERS

Reid A. Mahaffy, Cedar Grove, William E. Young, Ramsey, and John R. Harder, Cedar Grove, N. J., assignors to Standard Packing Corporation, New York, N. Y., a corporation of Virginia Application November 30, 1953, Serial No. 394,963

18 Claims. (Cl. 53—86)

This invention relates to a machine for evacuating and sealing containers. It is particularly adapted for use in evacuating and sealing bags made of flexible material, containing food stuffs and the like, and having flat mouth portions internally including a heat sealing material. The machine may be used only for sealing if desired. It is provided with sealing means for use with bags or other containers having heat sealable mouth portions, and this means is particularly useful when such mouth portions are apt to be wet or moist, and this heat sealing means may be applied to a wide range of uses wherever heat sealing is required.

One of the objects is to provide a machine which is capable of a high production rate, easily operated by a relatively unskilled operator, which may be used for the packaging of wet commodities or materials including a small amount of liquid, as well as for dry commodities or materials, and which is in general a machine better adapted for commercial use in the packaging of commodities in heat sealable bags.

Many of the principles of the present invention may very well prove applicable to the evacuation and sealing of other kinds of containers including possibly rigid containers and the like. This is to be kept in mind in connection with the following disclosure and claims.

A specific example of a machine for evacuating and sealing containers, which may, for example, be in the form of flexible bags containing food including a small amount of liquid and having heat sealing mouths, is illustrated by the accompanying drawings in which:

Fig. 1 is a front view of the machine;
Fig. 2 is a side view;
Fig. 3 is a back view;
Fig. 4 is a top view;
Fig. 5 is a partly sectioned view of details taken on the line 5—5 in Fig. 6;
Fig. 6 is a partly sectioned view of details taken on the line 6—6 in Fig. 2;
Fig. 7 is an end view taken on the line 7—7 in Fig. 6;
Fig. 8 is a vertical section taken generally on the line 3—8 in Fig. 2;
Fig. 9 is a vertical section taken on the line 9—9 in Fig. 8;
Fig. 10 is a cross section taken on the line 10—10 in Fig. 9;
Fig. 11 is a back view of Fig. 10;
Fig. 12 is a section taken on the line 12—12 in Fig. 8;
Fig. 13 is a cross section substantially taken on the line 13—13 in Fig. 9;
Fig. 14 is a section taken on the line 14—14 in Fig. 13;
Fig. 15 is a section taken on the line 15—15, 15a—15a in Fig. 14;
Fig. 16 is an end view taken on the line 16—16 in Fig. 17 and including a cross section taken on the line 16a—16a in Fig. 17;
Fig. 17 is a view showing details taken on the line 17—17 in Fig. 9;
Fig. 18 is a cross section taken on the line 18—18 in Fig. 4;
Fig. 19 is a top view of Fig. 18; and
Fig. 20 schematically shows a linear development of various cams incorporated by the machine.

This illustrated machine is a duplex machine incorporating two duplicate systems for evacuating and sealing the containers. In the interest of simplicity the following description is directed at only one system excepting where it may be necessary to refer to both. It is to be understood that both systems are exactly alike excepting that in certain instances the order of the parts is reversed.

Legs 1 support a hollow housing 2 mounting a slanting or declining table 3 at a convenient height for placing the containers thereon by an operator standing in front of the machine. An anvil platform 4 is transversely mounted on the top of the table 3 at a distance above the table's lower edge. This platform also declines but with less of an angularity than does the table top 3, so the lower edge of the platform 4 is spaced above the top of the table 3 a substantial distance. This platform forms a support for the mouth portion of one of the containers 5 when it is laid on top of the table 3 with its mouth portion overlying the platform 4. This arrangement has the advantage that the operator necessarily deflects the mouth portion of the bag to fit it on the platform 4, the deflection being angular respecting the balance of the container and tending to smooth the two walls of the container which form the mouth portion. A support 6 may be removably secured to the top of the table in front of the platform 4 so as to hold the container, the height of the support 6 depending on the thickness of the container 5 and the food or other merchandise which it contains.

The platform 4 supports an elastic heat sealing bar anvil 7 and transversely reciprocative pressure finger anvils 8, these being arranged parallel to each other so that the mouth portion of the container may overlie both of them. Holding vacuum holes 9 extend through the platform 4 and the heat sealing anvil bar 7 so that by drawing a vacuum through these holes 9 the mouth portion of the container is anchored in place once the container is positioned with its mouth portion arranged as described. The declination of the table top 3 and, therefore, of the top of the support 6 is sufficient to cause the containers to gravitationally slide downwardly from the table top, and the holding vacuum arrangement just described permits the operator to manually place the container into position so that the container is then anchored by the holding vacuum. Any termination of this vacuum releases the container so that it automatically slides downwardly from the table top.

Behind the platform 4 the table top 3 mounts a bearing 10 which angles forwardly respecting the machine and in which a tubular mount 11 is reciprocatively arranged. This bearing 10 projects through a hole 3a formed through the table 3. The top of this mount extends above the top of the table 3 and rigidly mounts a bracket 12 which overhangs the platform 4. This bracket mounts an assembly 13 above the finger pad anvils 8 and this assembly provides guideways which extend diagonally inwardly from the ends of the platform 4. The pressure finger arms 14 are slidably arranged in each of these guideways and are provided with fingers 15 on their lower ends which press against the bag mouth portion above the anvils 8 and gradually move apart from each other as the bracket 12 moves downwardly with downward motion of the tubular mount 11. These finger arms 14 are biased downwardly by springs 16, relative to the assembly 13, and once the arms are moved upwardly, by the described action, they are held against downward movement, during upward motion of the assembly, by a latch 17 having a release 18 which when moved permits the arms to spring downwardly again. This arrangement is for the purpose of smoothing out the container top prior to its being sealed and, after sealing, prevent the top portion from being rumpled which would otherwise occur as the assembly 13 moves upwardly upon completion of the sealing. The mode in which the releases 18 are actuated will be described later.

The bracket 12 mounts the assembly 13 through a cross head 19 which also supports a heat sealing bar 20 located behind the assembly 13. It is to be understood that the containers have mouth portions which are heat sealable on their insides, whereby the sealing may be effected by heating sealing means. This heat sealing bar 20 has screws 21 extending upwardly from both of its ends through holes formed in the ends of the cross head 19, the screws 21 fitting these holes in a loose manner. Compression springs 22 between the heads of the screws 21 and the top of the cross head 19 serve to continuously pull the heat sealing bar 20 towards the cross head in an elastic manner, and centrally both the cross head 19 and the heat sealing bar 20 have sockets fitted by a single ball 23, whereby the heat sealing bar is mounted for limited universal motion respecting the cross head 19.

As described so far provision has been made for stretching or smoothing the container mouth portion transversely and for heat sealing this mouth portion. As previously explained the container should first be evacuated.

Evacuation of the container is effected by reason of a hollow head 24 having its rear end pivoted to the top of the table top 3 by pivots 25, this head 24 being shaped to substantially enclose the top of the tubular mount 11, its bracket 12, and the parts carried by this bracket, both when the mount is moved up or down, and so as to also enclose the portion of the table top 3 occupied by the container 5 and any support 6 which may be used under the container. This head 24 has an open bottom and an edge seal 26 which seats in a substantially air-tight manner on top of the table top 3 when the head is swung downwardly and closed. When the head is lifted or opened, by swinging it upwardly on its pivot 25, complete freedom is provided for the operator to position the container as has been described.

When the head is lowered and a vacuum is drawn inside of the head, the head is locked to the table by the atmospheric pressure. To permit the seal 26 to seal properly the pivots 25 are in the form of pins fixed to the head 24 and working in elongated openings 27 formed in brackets 28 mounted on the table top. These holes 27 are elongated at right angles to the table top 3 so as to not only permit the head to seat itself properly on the table top but also to permit the head to lift in a vertical direction for a short distance before swinging pivotally when lifting force is applied to the head. This action permits the seal to be lifted cleanly away from the table top without any relative sliding action between the two such as would gradually wear the seal.

The head 24 closes gravitationally and is opened by upward motion of the tubular mount 11, the bracket 12 mounting a roller 29 and the head 24 internally having an abutment 30 engaged by this roller 29 so that the head lifts with lifting motion of the tubular mount. The locations of the roller 29 and abutment 30 are such that when the tubular mount moves downwardly it permits the head to close completely prior to the mount's reaching its lowermost limits, this making allowance for the mount to move further downwardly to actuate the pressure fingers 15, which engage the container mouth portion just about when the head fully closes, and to thereafter bring the heat sealing bar downward to heat seal the mouth portion.

The tubular mount 11 functions as a duct to both evacuate and vent the inside of the head 24. The word "vent" is used in the sense that the part is connected to the atmosphere. The mount also functions as a passageway for conduits 31 for supplying heat to the heat sealing bar 20. The tubular mount 11 is provided with a closure 32 part-way down its length, this closure functioning as a baffle so as to define a conduit connecting above the baffle with the inside of the head. Ports 33 are formed through the side of the tubular mount 11 above this closure 32 and this portion of the tubular mount 11 is surrounded by a manifold 34 through which the tubular mount 11 may slide in a substantially air-tight or sealed manner.

The sealing is effected by a single seal 11a which is fitted around the mount 11 directly at the bottom of the manifold 34 which is otherwise a closed unit connected directly to the bottom of the table 3. Thus this single seal seals all of the moving parts which connect with the inside of the head when the head is closed on the table top, insofar as concerns parts required to open the head and to actuate the elements inside of the head.

The manifold 34 is formed as part of a valve casing and it connects the inside of the tubular mount with a main vacuum conduit 35 by way of a valve seat 36 closed by a valve head 37 which is biased closed by a compression spring 38. The head 37 has a stem 39 which projects forwardly respecting the machine and beyond the outside of the manifold or valve casing 34. The manifold may be vented because its back has an opening provided with a valve seat 40 closed by a valve head 41 which is biased closed by a compression spring 42. This valve head 41 also has an operating stem 43 which extends forwardly through the valve casing substantially parallel to the stem 39 and projecting beyond the forward side of the valve casing in the manner of the outer end of the stem 39.

It was previously explained that suction is drawn through the holes 9 for holding the container on the table. These holes 9 connect through a conduit 44 which connects through the valve casing with a conduit 45 connected with a source of vacuum which may, however, not be so intense a vacuum as is the vacuum source with which the main conduit 35 is connected. The connection between the conduits 44 and 45 is through a valve seat 46 closed by a valve head 47 which is biased closed by a compression spring 48. This valve head 47 also has an operating stem 49 extending forwardly through the valve casing and substantially parallel to the valve stems 39 and 43. Thus these three valve stems project forwardly and when any one is depressed its associated valve head is opened.

As initially explained the description has been preceded by referring to only one of the two duplicating systems. It is to be noted that the valving arrangement just described has both of its portions connected with the same main vacuum line 35, and the two conduits 45 likewise may join for connection to a common source of holding vacuum. Thus both systems operate from single vacuum sources in each instance.

The various valve stems described each has an operating rocker arm 50, 51 and 52, respectively. These arms are pivoted on the shaft 53 which is mounted transversely between the insides of the casing 2. The arm 50 works the stem 39, the arm 51 works the stem 43 and the arm 52 works the stem 49. These arms extend in a generally vertical direction with their upper ends bearing on the various valve stems and their lower ends extending well below the shaft 53. Each of these lower ends is actuated by a rotary cam. Thus a cam 54 works the lower end of the arm 50, a cam 55 works the arm 51 and a cam 56 rocks the arm 52. These cams are fixed to a cam shaft 57 which is journaled between the walls of the casing 2 on the latter's inside and this cam shaft is powered by a sprocket chain and wheel drive 58 which connects it with an electric motor 59 through a suitable speed reducer.

This cam shaft also mounts a cam 60 having a cam groove 61 in which a follower 62 rides, this follower being mounted by one end of a lever 63 having its other end pivoted on the shaft 53. This lever has a projection 64 mounting a roller 65 which engages an abutment 66 provided by a bracket 67.

This bracket 67 is rigidly fixed to the lower end of the tubular mount 11 so that when the roller 65 is lifted by the action of the cam groove 61 the mount is moved upwardly and downwardly, its downward motion being effected both by gravity and because the bracket 67 is connected with the projection 64 by a tension spring 68.

Referring back to the valve casing, it is to be noted that the condiut 44 which connects with the holding vacuum holes 9, not only connects with the conduit 45 but also with the inside of the casing which vents when the valve head 41 is opened. This is done by a short conduit 69 which connects the conduit 44 with the stem 43, the latter having a slot 70 cooperating with a stem guide 71 to function as a valve. The arrangement is such that shortly after the valve head 41 is opened the conduit 44 is connected with the then vented valve casing by way of the slot 70.

The machine is started and stopped by a hand-controlled shaft 72 which extends through the walls of the casing 2 and is externally provided with a handle lever 73a. This shaft 72 may be rotatively snapped to either of two positions determined by a rectangular block 74 secured to the shaft 72 and pivotally connected to a bent link 75 having its other end connected to a tension spring 76 which is suitably anchored. The link 75 is connected with the block 74 by a pivot pin 77 located to pass through a dead center position when the shaft is partly turned to either of its two positions, the spring 76 then snapping the shaft to one or another of its two positions and holding it there. The pivot pin 77 is extended so that when the shaft 72 is turned to one of its extreme positions this pin 77 engages the actuator 78 of a limit switch 79. This limit switch may be connected to power the motor 59 so as to turn the latter on and off, and it may also control the necessary motors required to effect vacuum and to supply heat to the heat sealing bar, if desired. In Fig. 2 a schematic arrangement is shown where the electric power lines 59a for the electric motor 59 include the switch 79 in series therewith. Actually this switch would ordinarily control a solenoid actuated power switch inserted in the lines 59a in accord with good and well known electrical engineering practices, the arrangement shown being in the interest of a simplified representation. When the shaft 72 is turned to the other of its extreme positions the cams 73 mounted on the shaft 72 engage extensions 74 on each of the brackets 67 so as to hold each of the tubular mounts 11 raised sufficiently to keep the heat sealing bar 20 free from its anvil 7. Usually the anvil 7 is made from elastic material which may be damaged if continuously compressed while heated by the heat sealing bar 20 for a long period of time. The trouble is prevented by the described arrangement.

The contours of the various cams are shown by Fig. 20. The line 61a shows the contour of the cam groove 61. It can be seen that as the cam 60 turns the head is first opened, is then closed by the mount 11 moving downwardly sufficiently, and after a period of time, the mount 11 moves further downwardly to cause operation of the spreading fingers and the heat sealing bar. The curve 54a shows the action of the cam 54 which operates to lift the valve head 37 during the period that the head 24 is closed and prior to actuation of the spreading and heat sealing action. The line 55a shows the action of the cam 55 which permits the valve head 41 to be closed from a time starting during the opening of the head 24 until after the heat sealing action, the venting valve head 41 being opened at other times to permit the head 24 to open. As previously explained the holding vacuum holes 9 are vented shortly after opening of the valve head 41. Ordinarily this venting releases the container so it may slide downwardly but if desired an arrangement may be made for sending compressed air backwardly through the holes 9 at the appropriate time when the container is to be released. The line 56a shows the action of the cam 56 which opens the holding vacuum valve head 47 shortly after the valve head 41 closes and until about the time the main vacuum valve 37 opens, the cam 56 then permitting the valve head 47 to close. This action is desirable because the main vacuum is normally more intense than is used for holding down the container, so the main vacuum source would draw from the holding vacuum source unless the connection between the two is terminated as described.

The illustrated machine is of the duplex type including two heads. The duplicating cams of each head are oriented rotatively 180° from the cams of the other head. The heads alternately open and close while the evacuating and sealing action proceeds alternately in the case of two heads.

The details described in connection with a single head work to advantage in the case of the duplex type, particularly when both heads and both sets of holding holes are connected to a single main vacuum source and to a single holding vacuum source respectively. For example, when the main vacuum valve 37 of one closed head is opened the connection of the holding holes of this closed head is segregated from the holding holes of the other head because the valve head 47 of the closed head is in its closed position. Therefore, the high vacuum in the closed head cannot draw through the holding hole interconnection between the two conduits 45 which connect with the single holding vacuum source. Since each head has a vacuumizing period of almost one half of its cycle time a maximum evacuating time is possible while still having the main vacuum source connected to but one head at a time so as to avoid the need for the large vacuum capacity required when a plurality of heads are connected in overlapping succession to the source.

It can now be appreciated that the construction of each of the described apparatus has been with the thought of the ease with which they may be combined to produce the duplex type of machine with its many practical advantages.

As shown a continuous conveyor 80 may be arranged to carry the filled but unsealed containers to either one or two operators stationed in front of the machine. It is possible for one operator to feed both heads. The operator picks up one of the containers fed by the conveyor 80 and lays the container on the table top 3 beneath the one of the heads which is opened. The heat sealing mouth is pulled so as to flatten it and is angularly disposed respecting the balance of the container, so as to further smooth the mouth with the mouth portion laid on top of the platform 4 and over the two anvils 7 and 8. The suction being drawn through the holes 9 grips the mouth portion so the operator may remove his or her hands promptly as the head starts to descend. Just before the head completely closes the fingers 15 engage the mouth portion lightly so as to hold the container on the slanting table top as the holding vacuum is terminated by closing of the valve head 47. The valve head 37 then opens so that the container and head are evacuated, the head 24 then being closed and, by action of the cam groove 61 the assembly 13 and the heat sealing bar 20 are drawn downwardly so that while moving downwardly the mouth portion of the container is smoothed and stretched transversely, after which the heat sealing bar descends. The roller 65 and the abutment 66 are arranged so as to separate during the final heat sealing stage so that the heat sealing bar is pulled downwardly by the tension of the spring 68 which normally keeps the roller 65 in engagement with the abutment 66. The action of the cam 55 opens the valve head 41 so that the head begins to vent, the rising pressure compressing the container walls together and particularly the mouth portions so as to reduce any tendency for the mouth portions to open as the sealing bar is released and the seal still is weak. Thereafter the action of the cam groove 61 lifts the mount 11 so as to raise the heat sealing bar 20 and the assembly 13, the finger arms 14 remaining latched upwardly at this time. Shortly thereafter the roller 29 engages the abutment 30 and lifts the head open, the main vacuum valve head 37 having previously closed and the venting valve head 41 having been opened. The opening of the valve head 41 also vents the vacuum holding holes 9 so that the container is released and slides down the table. A chute 81 may be arranged to direct the discharging evacuated and sealed container to a conveyor 82 which carries the resulting package away from the machine. The speed with which the two heads go through their cycles may be arranged to permit a single operator to work continuously when feeding the containers to the machine, the operator always having an open head requiring feeding.

In the event one of the heads 24 should close on the hands of an operator no injury results because this head is relatively light in weight and lowered solely by gravity. No vacuum can be drawn within the head so long as the head remains opened. Injury to the operator's hands due to the descending action of the heat sealing bar 20, is prevented by an abutment 83 which is connected to the bracket 12 which controls the motion of the heat sealing bar 20. This abutment is strutted upwardly by a lever 84 which is pivoted to the table top 3 and which is biased by a spring 85 to move beneath the abutment 83 while the head 24 is opened. The head carries a leaf spring 86 which bears against a pin 87 fixed to the lever 84 so as to swing the lever 84 out of the path of the descending abutment 83 when the head 24 is substantially closed.

The declining table top 3 is of particular advantage in connection with the packaging of food or other products including at least some liquid. The angularity permits a container containing liquid to always be positioned with its mouth portion uppermost so as to keep the liquid away from the inside of the mouth portion which is to be heat sealed.

When packaging material which includes a liquid it is, however, impractical to prevent at all times some liquid or moisture from getting between the heat sealing area of the mouth portion of the container. The illustrated machine diminishes trouble in this direction by making the top of the heat sealing bar anvil 7 somewhat convex in a transverse direction so that as the heat sealing bar presses against the anvil liquid is squeegeed from the heat sealing zone. Even so this action may leave some moisture which must be vaporized and driven away to effect heat sealing.

Heretofore heat sealing machines have ordinarily used heat sealing bars heated by electric resistance heaters. The electric power is controlled by a thermostat as required to keep the bar at the desired temperature. This has had the disadvantage that when called upon to provide the extra heat required to vaporize moisture within the heat sealing zone, the source of heat has been inadequate for practical reasons, to provide a continuous and uniform temperature. This trouble is caused by the varying demands made both throughout the length of the heat sealing surface and locally at possibly unpredictable zones within the length of the surface and even within the narrow confines of the width of the surface. The same kind of trouble may also be encountered even when the heat sealing area is dry.

In the case of the present machine the heat sealing bar 20 is made of metal and is internally provided with a passageway 88 which extends the full length of the heating bar and may be of as large diameter as can be contained within the dimensions of the heating bar. This passageway is located as closely as possible to the heat sealing surface of the bar and is coextensive with this surface, so as to get a minimum separation between the heating liquid and the heat sealing surface, and is continuously supplied with a rapid flow of liquid maintained sufficiently above the heat sealing temperature required to compensate for the necessarily incidental temperature drop, by being fed from a source of heated liquid of relatively large volume and maintained at the temperature thus required and considering all intervening heat loses. A suitable oil is used for this purpose. The large flow of heated oil maintains the heat sealing bar at the proper heat sealing temperature substantially uneffected by the heat required to vaporize any moisture or by any other variable conditions before the heat sealing action can proceed. Under normal operating conditions it is a practical impossibility for moisture in the heat sealing zone to materially lower the proper temperature of the heat sealing bar. Therefore, the present machine is particularly advantageous when used to heat seal containers containing wet products or small amounts of liquids, as exemplified by pickles wet with brine. Other problems introducing varying heat demands which are important are also overcome.

The hot oil is fed to the heat sealing bar by the conduits 31 which extend downwardly through the center of the tubular mount 11 and connect with the heat sealing bar by way of gooseneck portions 90. The terminating end of these portions connects directly with the heat sealing bar 20, which moves with the mount 11, and centrally respecting the top of the mount. The conduits 31 connect with the latter by way of a springy mount 91 which acts as a leaf spring in the plane of the goosenecks 90 so that the latter may expand and contract laterally, the mount 91 being rigid to all other motions. The conduits 31 continue downwardly through the inside of the mount 11 and pass through the closure 32 to which these conduits are rigidly fixed. The closure 32 is in the form of a piston-like seal arrangement which may move upwardly and downwardly slightly within the tubular mount 11 to accommodate thermal or other expansion and contraction of the conduits 31. The lowermost ends of the conduits 31 terminate in a terminal arrangement 92 which connects with flexible conduits 93 which lead to the feed and return ports of a suitable liquid heater equipped with a pump for maintaining a forced circulation of the hot liquid. The liquid heater should have sufficient capacity to provide for a rapid flow of liquid uniformly having a temperature as required for the heat sealing as the liquid is supplied to the system leading to the heat sealing bar.

In summarizing the foregoing it should be noted that the bearing 10 and the manifold or valve casing are compactly grouped only slightly below the table top so that the passage length of the various conduits through which the atmosphere must be sucked, are in all instances very short and compact. All parts of the machine are relatively accessible. The back of the valve casing may be made detachable as shown so that when open all of the valves are readily accessible through the back of the machine.

It should also be noted that the convex shape of the heat sealing bar anvil results in good heat sealing action even though the heat sealing bar may tip somewhat transversely relative to the anvil. Furthermore, the described gooseneck conduit forms and the described flexible mounting 91 prevent thermal expansion and contraction of the conduits from straining the universally mounted heat sealing bar materially from its proper position. In other words, the conduits can give or move while the heat sealing bar remains in position. Also, tilting action lengthwise of the heat sealing bar is permitted because the gooseneck conduit portions may be pivotally connected to the mounting 91, the conduit lengths below the mounting 91 being capable of flexing or bowing.

In using the platform 4 as described, it is to be understood that the bag mouth portions are flattened in the sense that their inner surfaces tend to be forced together, although the mouth portions may either define a curved or wavy shape. Due to the inherent stiffness of heat sealing bags the mouth portions tend to retain this inter-contacting relationship due to the resulting mechanical shape, particularly when the bags contain material which is thick and thus struts the bag walls apart below these portions.

We claim:

1. A machine for evacuating and sealing containers and including a stationary wall, a hollow head having an open side facing the wall and located adjacent thereto, means for mounting the head for movement towards and away from the wall, the head and wall being constructed to enclose a container positioned therebetween when the head is moved towards the wall, a passage being formed through the wall in registration with the head's open side and the head being biased to move towards the wall, a tubular mount reciprocatively projecting through the passage and having an end on the side of the wall faced by the head and an extended portion on the opposite side of the wall, container sealing means located between the wall and head and connected to the mount's end so as to be actuated by movement of the mount away from the head, an element fixed to the mount's end so as to abut the head and push the head away from the wall when the mount is moved towards the head, means located on the opposite side of the wall for reciprocating the mount's extended portion, a suction manifold located on the opposite side of the wall in sliding suction connection with the mount's extended portion, and means for connecting the manifold with a vacuum source when the mount is moved away from the head.

2. A machine for evacuating and sealing containers and including a stationary wall, a hollow head having an open side facing the wall and located adjacent thereto, means for mounting the head for movement towards and away from the wall, the head and wall being constructed to enclose a container positioned therebetween when the head is moved towards the wall, a passage being formed through the wall in registration with the head's open side and the head being biased to move towards the wall, a tubular mount reciprocatively projecting through the passage and having an end on the side of the wall faced by the head and an extended portion on the opposite side of the wall, container sealing means located between the wall and head and connected to the mount's end so as to be actuated by movement of the mount away from the head, an element fixed to the mount's end so as to abut the head and push the head away from the wall when the mount is moved towards the head, means located on the opposite side of the wall for reciprocating the mount's extended portion, a suction manifold located on the opposite side of the wall in sliding suction connection with the mount's extended portion, and means for connecting the manifold with a vacuum source when the mount is moved away from the head, the suction manifold being positioned between the reciprocating means and the wall and in close proximity to the wall and the means for connecting the manifold source with a vacuum comprising a valve in close proximity to the manifold.

3. A machine for evacuating and sealing containers and including a stationary wall, a hollow head having an open side facing the wall and located adjacent thereto, means for mounting the head for movement towards and away from the wall, the head and wall being constructed to enclose a container positioned therebetween when the head is moved towards the wall, a passage being formed through the wall in registration with the head's open side and the head being biased to move towards the wall, a tubular mount reciprocatively projecting through the passage and having an end on the side of the wall faced by the head and an extended portion on the opposite side of the wall, container sealing means located between the wall and head and connected to the mount's end so as to be actuated by movement of the mount away from the head, an element fixed to the mount's end so as to abut the head and push the head away from the wall when the mount is moved towards the head, means located on the opposite side of the wall for reciprocating the mount's extended portion, a suction manifold located on the opposite side of the wall in sliding suction connection with the mount's extended portion, and means for connecting the manifold with a vacuum source when the mount is moved away from the head, the suction manifold being positioned between the reciprocating means and the wall and in close proximity to the wall and the means for connecting the manifold source with a vacuum comprising a valve in close proximity to the manifold, the manifold and valve being constructed as a unit mounted against the wall's opposite side.

4. A machine for evacuating and sealing containers and including a stationary wall, a hollow head having an open side facing the wall and located adjacent thereto, means for mounting the head for movement towards and away from the wall, the head and wall being constructed to enclose a container positioned therebetween when the head is moved towards the wall, a passage being formed through the wall in registration with the head's open side and the head being biased to move towards the wall, a tubular mount reciprocatively projecting through the passage and having an end on the side of the wall faced by the head and an extended portion on the opposite side of the wall, container sealing means located between the wall and head and connected to the mount's end so as to be actuated by movement of the mount away from the head, an element fixed to the mount's end so as to abut the head and push the head away from the wall when the mount is moved towards the head, means located on the opposite side of the wall for reciprocating the mount's extended portion, a suction manifold located on the opposite side of the wall in sliding suction connection with the mount's extended portion, and means for connecting the manifold with a vacuum source when the mount is moved away from the head, the head's mounting means being located in spaced relation to the mount's end and mounting the head both for pivotal motion respecting the wall and for limited linear motion towards and away from the wall.

5. A machine for evacuating and sealing containers and including a stationary wall, a hollow head having an open side facing the wall and located adjacent thereto, means for mounting the head for movement towards and away from the wall, the head and wall being constructed to enclose a container positioned therebetween when the head is moved towards the wall, a passage being formed through the wall in registration with the head's open side and the head being biased to move towards the wall, a tubular mount reciprocatively projecting through the passage and having an end on the side of the wall faced by the head and an extended portion on the opposite side of the wall, container sealing means located between the wall and head and connected to the mount's end so as to be actuated by movement of the mount away from the head, an element fixed to the mount's end so as to abut the head and push the head away from the wall when the mount is moved towards the head, means located on the opposite side of the wall for reciprocating the mount's extended portion, a suction manifold located on the opposite side of the wall in sliding suction connection with the mount's extended portion, and means for connecting the manifold with a vacuum source when the mount is moved away from the head, the sealing means being of the heat sealing type and having conduits for supplying heat thereto and which extend through the inside of the tubular mount and away from the mount's extended portion on the wall's opposite side.

6. A machine for evacuating and sealing containers and including a stationary wall, a hollow head having an open side facing the wall and located adjacent thereto, means for mounting the head for movement towards and away from the wall, the head and wall being constructed to enclose a container positioned therebetween when the head is moved towards the wall, a passage being formed through the wall in registration with the head's open side and the head being biased to move towards the wall, a tubular mount reciprocatively projecting through the passage and having an end on the side of the wall faced by the head and an extended portion on the opposite side of the wall, container sealing means located between the wall and head and connected to the mount's end so as to be actuated by movement of the mount away from the head, an element fixed to the mount's end so as to abut the head and push the head away from the wall when the mount is moved towards the head, means located on the opposite side of the wall for reciprocating the mount's extended portion, a suction manifold located on the opposite side of the wall in sliding suction connection with the mount's extended portion, and means for connecting the manifold with a vacuum source when the mount is moved away from the head, the sealing means being in the form of a liquid-heated heat sealing bar, and a bracket connected to and extending transversely from the mount's end and mounting the bar offset laterally from the mount's end, liquid conduits having gooseneck portions extending from the bar to the central portion of the mount and having linear portions extending through the inside of the mount and away from the mount's extended portion, and means for connecting the gooseneck portions' ends which are remote from the heat sealing bar with the mount's end in a flexible manner in the plane of the gooseneck portions and rigidly respecting other directions.

7. A machine for evacuating and sealing containers and including a stationary wall, a hollow head having an open side facing the wall and located adjacent thereto, means for mounting the head for movement towards and away from the wall, the head and wall being constructed to enclose a container positioned therebetween when the head is moved towards the wall, a passage being formed through the wall in registration with the head's open side and the head being biased to move towards the wall, a tubular mount reciprocatively projecting through the passage and having an end on the side of the wall faced by the head and an extended portion on the opposite side of the wall, a container sealing means located between the wall and head and connected to the mount's end so as to be actuated by movement of the mount away from the head, an element fixed to the mount's end so as to abut the head and push the head away from the wall when the mount is moved towards the head, means located on the opposite side of the wall for reciprocating the mount's extended portion, a suction manifold located on the opposite side of the wall in sliding suction connection with the mount's extended portion, and means for connecting the manifold with a vacuum source when the mount is moved away from the head, the sealing means being in the form of a liquid-heated heat sealing bar, and a bracket connected to and extending transversely from the mount's end and mounting the bar offset laterally from the mount's end, liquid conduits having gooseneck portions extending from the bar to the central portion of the mount and having linear portions extending through the inside of the mount and away from the mount's extended portion, and means for connecting the gooseneck portions' ends which are remote from the heat sealing bar with the mount's end in a flexible manner in the plane of the gooseneck portions and rigidly respecting other directions, the linear conduit portions extending through the mount's extended portion to a location beyond the suction manifold, and at a location beyond the manifold an encircling baffle mounted on the conduits and in sliding engagement with the inside of the mount so as to air-tightly seal the latter while permitting expansion and contraction of the conduit's linear portions.

8. A machine for evacuating and sealing containers and including a stationary wall, a hollow head having an open side facing the wall and located adjacent thereto, means for mounting the head for movement towards and away from the wall, the head and wall being constructed to enclose a container positioned therebetween when the head is moved towards the wall, a passage being formed through the wall in registration with the head's open side and the head being biased to move towards the wall, a tubular mount reciprocatively projecting through the passage and having an end on the side of the wall faced by the head and an extended portion on the opposite side of the wall, container sealing means located between the wall and head and connected to the mount's end so as to be actuated by movement of the mount away from the head, an element fixed to the mount's end so as to abut the head and push the head away from the wall when the mount is moved towards the head, means located on the opposite side of the wall for reciprocating the mount's extended portion, a suction manifold located on the opposite side of the wall in sliding suction connection with the mount's extended portion, and means for connecting the manifold with a vacuum source when the mount is moved away from the head, the means for reciprocating the mount's extended portion having an abutment connection for pushing the portion towards the head and elastic means for biasing the connection closed, and means for positively strutting the mount's end against motion away from the head and actuated by the head's open side being spaced from the side of the wall faced thereby.

9. A machine for evacuating and sealing containers and including a stationary wall, a hollow head having an open side facing the wall and located adjacent thereto, means for mounting the head for movement towards and away from the wall, the head and wall being constructed to enclose a container positioned therebetween when the head is moved towards the wall, a passage being formed through the wall in registration with the head's open side and the head being biased to move towards the wall, a tubular mount reciprocatively projecting through the passage and having an end on the side of the wall faced by the head and an extended portion on the opposite side of the wall, container sealing means located between the wall and head and connected to the mount's end so as to be actuated by movement of the mount away from the head, an element fixed to the mount's end so as to abut the head and push the head away from the wall when the mount is moved towards the head, means located on the opposite side of the wall for reciprocating the mount's extended portion, a suction manifold located on the opposite side of the wall in sliding suction connection with the mount's extended portion, and means for connecting the manifold with a vacuum source when the mount is moved away from the head, the sealing means including a heat sealing bar connected to the mount's end and an elastic anvil connected to the wall and engaged by the bar when the mount is moved away from the head, the means for reciprocating the mount's extended portion having a separable abutment connection for pushing the portion towards the head and elastic means for biasing the connection closed, the reciprocating means having an operating motor and a control for stopping the motor, and means actuated by actuation of this control for mechanically pushing the mount towards the head far enough to separate the heat sealing bar from its anvil.

10. A machine for heat sealing bags having flat mouth portions which are heat-sealable, the machine including structure forming a surface against which the bags are positioned, a secondary surface including a heat sealing bar anvil on which the mouth portions are positioned, the secondary surface slanting away from the first-named surface so that the mouth portions must be angled away from the bags when being positioned on the secondary surface and the anvil and thereby being imparted a flattening tendency, and a heat sealing bar reciprocatively mounted to press against the anvil and a bag mouth positioned thereon, the first-named surface declining from the secondary surface at an angle gravitationally causing the bags to slide downwardly, and holes being formed through the secondary surface and means for sucking through the holes so as to anchor the flattened bag mouth portions thereon.

11. A machine for evacuating and heat sealing the mouths of bags having flat heat-sealable mouth portions, the machine including an upstanding structure having a front and forming a table on top of which the bags are positioned and which table declines towards the front at an angle gravitationally causing the bags to slide downwardly towards the front, a hollow head having an open side facing the table top, means for mounting the rear side of the head pivotally on the table top so that the head may swing opened and closed relative to the table top, a passage being formed through the table beneath the head and adjacent to its rear side, a tubular mount reciprocatively projecting through the passage and having an upper end above the table top and an extended portion below the table, a combined manifold and valve casing located directly below the table and connected therewith and encircling the mount's extended portion and in fluid communication therewith, the mount's extended portion reciprocating through the casing and having a lower end projecting below the casing and the latter having a main vacuum port for connection with a vacuum source, a valve in the casing for controlling the flow between the port and mount and having a reciprocating stem projecting through the casing from the valve for operating the latter when the stem is reciprocated, a cam shaft located in the structure below the casing, a cam follower mounted on the mount's lower end, a cam on the cam shaft and engaging the follower and contoured so that rotation of the cam alternately moves the mount upwardly and back to a dwell position and downwardly and back to this dwell position, means on the mount's upper end for separably abutting and pushing the head when the mount is moved upwardly back to its dwell position, a heat sealing bar mounted on the mount's upper end to seal the mouths of bags positioned on the table top and so as to be actuated by the mount moving downwardly and back to its dwell position, a second cam on the cam shaft, a second follower engaged by the second cam and connected to the valve stem to reciprocate the latter upon rotation of the second cam, the latter being contoured to cause the valve to open while the first-named cam maintains the mount at its dwell position, and means for rotating the cam shaft.

12. A container evacuating and sealing machine including a stationary table having two laterally spaced operation stations adapted for the manual placement of containers at these stations, a hollow head having an open side for each of the stations, means for mounting each head at its station so it opens and closes against the table, means for alternately opening and closing the two heads continuously so that one head is opened while the other is closed, means for evacuating each head while it is closed and for sealing a container therein while evacuated, and means for synchronizing the actuation of the second and third named means so that they actuate with substantially equal time intervals therebetween.

13. A machine as defined by claim 12 and having the evacuating means interconnected for connection to a single vacuum source, and including means for positively segregating each head from its interconnection with the other while that head is connected with the vacuum source.

14. An evacuating machine including a wall, a hollow head having an open side facing the wall, means for mounting the head for substantially linear motion at least at one end while adjacent to the wall and for pivotal motion at said end while removed from the wall, a seal for the periphery of the open face to seal against the wall, and means for evacuating the head while it is closed against the wall.

15. A machine including a wall, a hollow head having an open side facing the wall and mounted to open and close relative to the wall, the wall having an opening therethrough registering with the head, a tubular mount extending through the opening and having an end portion for both actuating the head to open and close it and to form a fluid connection with the inside of the head when it is closed, a casing mounted on the opposite side of the wall and surrounding and enclosing radially a portion of the mount extending beyond this opposite side and this extending portion projecting beyond the end of this casing, and a seal for sealing this projecting portion relative to the casing and permitting motion of the mount relative to the casing.

16. A machine as defined by claim 15 and including heating means located inside of the head when the head is closed and conduit means for this heating means and which extend therefrom through the tubular mount.

17. A machine as defined by claim 15 and including heating means located inside of the head when the head is closed and conduit means for this heating means and which extend therefrom through the tubular mount, the heating means being connected to the mount and moving therewith and the conduit means being connected to the mount and also moving therewith.

18. In a machine having a table and a head opening and closing relative to the table and a clamp-like mechanism located inside of the head and normally actuating when the head is closed and thus protecting the mechanism, means actuated by the head being opened for locking said mechanism against actuation.

References Cited in the file of this patent

UNITED STATES PATENTS

| | | |
|---|---|---|
| 2,133,716 | Reitzes | Oct. 18, 1938 |
| 2,140,117 | Salfisberg | Dec. 13, 1938 |
| 2,196,081 | Reynoldson | Apr. 2, 1940 |
| 2,277,288 | Berch | Mar. 24, 1942 |
| 2,466,735 | Piazze | Apr. 12, 1949 |
| 2,496,609 | Van Antwerpen | Feb. 7, 1950 |
| 2,601,020 | Hopp | June 17, 1952 |
| 2,630,955 | Moses et al. | Mar. 10, 1953 |
| 2,659,520 | Reitzes | Nov. 17, 1953 |
| 2,672,268 | Bower | Mar. 16, 1954 |
| 2,676,440 | Campbell | Apr. 27, 1954 |